United States Patent
Murray et al.

[15] 3,686,318
[45] Aug. 22, 1972

[54] VAPOR PHASE CONVERSION OF CYCLOHEXANECARBOXYLIC ACID TO CYCLOHEXANONE

[72] Inventors: Edward J. Murray, Buffalo; Leon O. Winstrom, East Aurora, both of N.Y.

[73] Assignee: Allied Chemical Corporation, New York, N.Y.

[22] Filed: Jan. 17, 1969

[21] Appl. No.: 800,795

Related U.S. Application Data

[63] Continuation of Ser. No. 615,843, Feb. 13, 1967, abandoned, which is a continuation of Ser. No. 360,132, April 15, 1964, abandoned.

[52] U.S. Cl..............................260/586 R, 252/475
[51] Int. Cl................................................C07c 45/18
[58] Field of Search...................260/586 R; 252/475

[56] References Cited

UNITED STATES PATENTS 3,219,689   11/1965   Bigot et al..........260/586 R X

FOREIGN PATENTS OR APPLICATIONS 1,296,938   5/1962    France...................260/586 R
299,947     8/1965    Netherlands...........260/586 R
6,504,809   10/1965   Netherlands...........260/586 R

OTHER PUBLICATIONS

Bigot et al., " Rec. Trav. Chim" Vol. 83, pp. 1,199–1,210 (1964)

*Primary Examiner*—Bernard Helfin
*Assistant Examiner*—Norman Morgenstern
*Attorney*—Michael S. Jarosz

[57]  ABSTRACT

A process for preparing cyclohexanone whereby a mixture of cyclohexane carboxylic acid in the vapor phase and a gas containing molecular oxygen at temperatures of from about 250°C. to 600°C. are passed through a static catalyst bed, said catalyst containing copper or a copper salt.

7 Claims, No Drawings

VAPOR PHASE CONVERSION OF CYCLOHEXANECARBOXYLIC ACID TO CYCLOHEXANONE

This application is a continuation of our application Ser. No. 615,843, filed Feb. 13, 1967, now abandoned, which was a continuation of our application Ser. No. 360,132, filed Apr. 15, 1964, now abandoned.

The present invention relates to the preparation of alicyclic ketones from alicyclic carboxylic acids. In particular, it is concerned with the vapor phase conversion of cyclohexanecarboxylic acid to cyclohexanone.

Cyclohexanone is a valuable intermediate in the production of caprolactam, a precursor of commercially important synthetic fibers.

It is an object of the present invention to devise a procedure for the vapor phase conversion of cyclohexanecarboxylic acid to cyclohexanone.

It is another object of the present invention to devise a procedure that will be inexpensive, employing readily available reagents and conventionally designed equipment.

This and other objects and advantages will be apparent from the following description of our invention.

We have made the surprising discovery that cyclohexane-carboxylic acid is converted to cyclohexanone by contacting a mixture of the vaporized acid and a gas containing molecular oxygen with a copper catalyst at a temperature of about 250° to 600° C. This may be done batchwise or in a continuous manner.

According to a preferred embodiment of the present invention, we employ the catalyst of U.S. Pat. No. 2,552,300, which comprises copper and zinc in the form of the metals or their oxide or in part as the metals and in part as the oxides.

Conveniently, the present process is carried out in a suitable chamber called a converter, containing the heated catalyst and a preheating section consisting of a suitable inert material such as alumina. The mixture of oxygen containing gas and vapors of cyclohexanecarboxylic acid is passed through the converter wherein the vapors and the catalyst are brought into brief and intimate contact. An efficient heat exchange medium, e.g. refluxing mercury, surrounding the converter assists in the control of the resulting highly exothermic reaction. Such a converter is disclosed in U.S. Pat. No. 1,604,739.

The present process is preferably carried out in the presence of steam which is mixed with the vapor charge before the latter enters the converter.

Our process yields 60 percent or more of crude product based on the weight of cyclohexanecarboxylic acid vaporized. The crude product contains up to about 45 percent by weight cyclohexanone as well as minor amounts (about 3 percent or less) of cyclohexanol and cyclohexene, and unreacted cyclohexane-carboxylic acid. The unreacted cyclohexanecarboxylic acid may be separated out by steam distillation and recycled back to the converter, which also contains unreacted starting material. In this manner an efficient continuous process is afforded.

The present invention is illustrated by the following examples in which parts are by weight unless otherwise noted and temperatures are in degrees centigrade.

EXAMPLES 1 to 4

In Examples 1 to 4, the results of which are presented in Table I below, the following general procedure was used.

Cyclohexanecarboxylic acid was evaporated into a stream of air (by bubbling air through a body of the molten acid maintained at 160°–165°C.), mixed with steam, and passed through a mercury cooled refractory tube which contained a heated copper zinc catalyst (440 grams, 0.150 liter, 50 percent voids) prepared as described in U.S. Pat. No. 2,552,300, and a preheating section of porous fused alumina (Alundum Al-38, 103 grams, 0.066 liter). The effluent gases from the converter were cooled to about 25° C. in a water-cooled condenser and gave a condensate which separated into an organic layer and an aqueous layer. The crude organic layer was withdrawn, dried over molecular sieves (Linde 4A; 1 part per 50 parts by volume crude) and analyzed by vapor phase chromatography.

EXAMPLE 5

The procedure employed in Examples 1–4 was repeated except that the air and steam flow rates were varied at intervals. After each interval of operation under a given set of conditions, the crude product obtained was analyzed by vapor phase chromatography. The average rate of consumption of cyclohexane carboxylic acid was 83 parts per hour. The results of this experiment are tabulated in Table 2.

TABLE I

| Ex. No. | Cyclohexanecarboxylic acid | Minimum (1) flow rates | | Parts of air per part cyclohexanecarboxylic acid | Duration of run (hours) | Parts of steam per part of air | Initial catalyst temperature | Back pressure mm. Hg (2) | Percent yield of crude product (3) | Percent cyclohexanone in crude product (4) | Percent cyclohexanecarboxylic acid in crude product (4), recycled to converter |
|---|---|---|---|---|---|---|---|---|---|---|---|
| | | Air | Steam | | | | | | | | |
| 1 | 146 gms/hr. | 452 | 534 | 1.75 | 16 | 0.73 | 403 | 75 | 62.4 | 23.9 | 70.1 |
| 2 | 134 gms/hr. | 457 | 594 | 1.9 | 13.5 | 0.81 | 405 | 70 | 47.9 | 30.8 | 61.1 |
| 3 | 85.5 gms/hr. | 428 | 465 | 2.74 | 36.5 | 0.67 | 404 | 45 | 37.8 | 33.0 | 53.3 |
| 4 | 105 gms/hr. | 387 | 319 | 2.23 | 18 | 0.51 | 360 | 72 | 43.5 | 44.19 | 43.79 |

Notes:
(1) Calculated from initial catalyst temperature and expressed in liters of gas per hour.
(2) Atmospheric pressure was 750 mm. Hg.
(3) Based on weight of cyclohexanecarboxylic acid vaporized. Contains about 5% water.
(4) As determined by vapor phase chromatography of dried crude product.

TABLE 2

| perating interval | Maximum (1) flow rates | | Parts steam per part air | Duration of run (hours) | Maximum catalyst temperature (2) | Back pressure mm. Hg (3) | Percent cyclohexanone in crude product (4) | Percent cyclohexanecarboxylic acid in crude product (4), recycled to converter |
|---|---|---|---|---|---|---|---|---|
| | Air | Steam | | | | | | |
| 1 | 429 | 345 | 0.5 | 2.5 | 361 | 64 | 47.57 | 32.94 |
| 2 | 433 | 232 | 0.33 | 1 | 360 | 55 | 31.24 | 57.08 |
| 3 | 509 | 256 | 0.31 | 1 | 465 | 50 | 29.82 | 59.04 |
| 4 | 533 | 0 | 0 | 1 | 500 | 50 | 30.09 | 55.89 |
| 5 | 538 | 236 | 0.27 | 1 | 519 | 63 | 30.63 | 57.59 |
| 6 | 558 | 0 | 0 | 1.5 | 567 | 80 | 23.56 | 46.26 |

Notes:
(1) Calculated from the maximum catalyst temperature and expressed in liters of gas per hour.
(2) Initial catalyst temperature was 320°.
(3) Atmospheric pressure was 750 mm. Hg.
(4) As determined by vapor phase chromatography of the dried crude product.

It can thus be seen that a novel vapor phase process for converting cyclohexanecarboxylic acid to cyclohexanone has been devised.

The foregoing examples illustrate the process of our invention and it will be obvious to those skilled in the art that considerable variation in the illustrative details can be made without departing from the spirit and scope of the invention.

For example, the conditions of temperature, pressure, contact time, etc., to be maintained in our process will depend upon the catalyst employed, the activity of the catalyst (as influenced, for example, by its method of preparation), the concentration of the various components of the vapor phase mixture treated and other factors familiar to those skilled in the art.

Flow rates may vary from 0.2 to 10 parts cyclohexane carboxylic acid per hour per part of catalyst. The reactor charge may contain from 1 to 3 parts oxygen containing gas per part of cyclohexane carboxylic acid and from 0 to 5 parts of steam per part of oxygen containing gas.

Although we prefer to employ the copper zinc catalyst disclosed in U.S. Pat. No. 2,552,300 (column 2, line 50), any copper-containing substance can be used including
copper metal
cuprous oxide
copper chromite
cupric oxide.

As the oxygen-containing gas, oxygen or oxygen mixed with an inert diluent such as nitrogen can be used in the present process. Preferably, however, air is employed.

To initiate the reaction, the catalyst temperature should be at least about 250°C. According to the preferred embodiment of the instant invention, the catalyst temperature at the start of the reaction is about 300° to 420°C. However, catalyst temperatures considerably above the initial temperature result during the reaction due to the exothermic character of the process. In order to obtain satisfactory yields of cyclohexanone, reaction conditions should be selected so as to avoid catalyst temperature in excess of about 600°C.

The present invention affords cyclohexanone, a valuable intermediate in the manufacture of caprolactam by the vapor phase conversion of cyclohexanecarboxylic acid employing inexpensive and readily available reagents and equipment of conventional design.

We claim:

1. The continuous process of producing cyclohexanone which comprises continuously passing a mixture of vaporous cyclohexanecarboxylic acid and a gas containing molecular oxygen through a static bed of a catalyst consisting essentially of mixtures of copper, cuprous oxide or cupric oxide with zinc or zinc oxides, said catalyst being in the solid state throughout said passage, at a temperature between about 250°C. and about 600°C. to effect conversion of said acid to cyclohexanone, continuously discharging reaction products from said static bed and recovering cyclohexanone therefrom.

2. The process of claim 1 wherein the catalyst consists essentially of copper and zinc.

3. The continuous process of producing cyclohexanone which comprises continuously passing a mixture of vaporous cyclohexanecarboxylic acid and a gas containing molecular oxygen in a ratio of 1 to 3 parts of said gas to 1 part of said acid through a static bed of a catalyst consisting essentially of a mixture of copper and zinc, said catalyst being in the solid state throughout said passage, at a temperature between about 300°C. to about 600°C. to effect conversion of said acid to cyclohexanone, continuously discharging reaction products from said static bed and recovering cyclohexanone therefrom.

4. The process according to claim 3 wherein said gas comprises oxygen.

5. The process according to claim 3 wherein said gas comprises a mixture of oxygen and nitrogen.

6. The continuous process of producing cyclohexanone which comprises continuously passing a mixture of vaporous cyclohexanecarboxylic acid and air in a ratio of 1 to 3 parts of air to 1 part of said acid in the presence of up to 5 parts of steam per part by weight of air through a static bed of catalyst consisting essentially of a mixture of copper and zinc, said catalyst being in the solid state throughout said passage, at a temperature between about 250°C. and about 600°C. to effect conversion of said acid to cyclohexanone, continuously discharging crude reaction products from said static bed, recovering cyclohexanone therefrom, recovering the unreacted cyclohexanecarboxylic acid from the crude reaction products and recycling said acid for passage through said static bed.

7. The process of claim 6 wherein the flow rate ranges from 0.2 to 10 parts by weight per hour of cyclohexanecarboxylic acid per part catalyst.

* * * * *